United States Patent [19]

Maeno

[11] Patent Number: 5,786,917
[45] Date of Patent: Jul. 28, 1998

[54] OPTICAL SWITCHING NETWORK AND CONTROL METHOD FOR SAME

[75] Inventor: Yoshiharu Maeno, Tokyo, Japan

[73] Assignee: NEC Corporation, Tokyo, Japan

[21] Appl. No.: 767,205

[22] Filed: Dec. 16, 1996

[30] Foreign Application Priority Data

Dec. 23, 1995 [JP] Japan ................... 7-350139

[51] Int. Cl.$^6$ .................................. H04J 14/02
[52] U.S. Cl. ................ 359/128; 359/123; 370/412
[58] Field of Search .................. 359/128, 133, 359/139, 117, 113; 370/412–418

[56] References Cited

U.S. PATENT DOCUMENTS

| | | | |
|---|---|---|---|
| 4,608,682 | 8/1986 | Nagashima et al. | 370/4 |
| 5,091,905 | 2/1992 | Amada | 370/415 |
| 5,101,290 | 3/1992 | Eng et al. | 359/123 |
| 5,105,292 | 4/1992 | Le Roy et al. | 319/123 |
| 5,450,225 | 9/1995 | Bostica et al. | 319/139 |

OTHER PUBLICATIONS

"Fiber Channel Physical and Signaling Interface (FC–PH)", in ANSI X3 T11, REV. 4.3, 1994, pp. 19–20.

*Primary Examiner*—Kinfe-Michael Negash
*Attorney, Agent, or Firm*—Scully, Scott, Murphy and Presser

[57] ABSTRACT

An optical switching network and control method are disclosed which include a network interface circuit and an optical switching device. The network interface device divides messages into control and data packets, and has transmission buffers for the storage of the control packets and data packets. Retry buffers for the temporary shunting and storage of control packets and data packets are provided, as well as a queue control circuit for controlling the transmission buffers and retry buffers. An optical transmitter electro-optically converts the data packets and outputs the results to an optical transmission path. An optical receiver is also provided for photoelectric conversion of optical signals inputted from the optical transmission path. A reception buffer stores the output of the optical receiver as reception data. The optical switching device includes an optical switch that performs a routing process on data packets transmitted from the optical transmitter, and an arbiter that performs management of line connection information, processing of control packets from the data transmitter, transmission of control signals to the queue control circuit, and switching control of the optical switch.

13 Claims, 7 Drawing Sheets

OPTICAL SWITCHING NETWORK AND CONTROL METHOD FOR SAME

BACKGROUND OF THE INVENTION

1. Field of the Invention

The present invention relates to an optical switching device and a control method for the device, and particularly to an optical switching network and control method for application to connections between processors in a multiprocessor system.

2. Description of the Related Art

In the interest of raising network throughput, optical interconnection technology in which data are transmitted as optical signals using optical fibers is now being introduced in multiprocessor systems in which a plurality of processors are interconnected by way of a high-speed coupling network, operate in concert, and perform coordinated processing as a unit.

Many studies and proposals have been advanced with respect to optical interconnection regarding not only link connection between two processors but also networks in which a multiplicity of processors are connected by way of switches. One representative example is a method by which switches that handle signal routing processes are provided in addition to processors, and each processor and switch are connected by optical fibers. This type of technology is described in, for example, "Fiber Channel Physical and Signaling Interface (FC-PH)" in ANSI X3 T11, REV 4.3, 1994, pp. 19–20.

FIG. 1 shows a prior-art construction of a network made up of a four-input four-output switching device using a crossbar switch as a switch, and a processor input/output port.

In FIG. 1, 500 indicates a processor input/output port, 510 indicates a network interface, 520 indicates a first-in first-out (FIFO) transmission queue, 521 and 522 represent first-in first-out (FIFO) reception queues, 550 and 553 indicate optical transmitters, 551 and 552 indicate optical receivers, 560 represents an optical switching device, 570 indicates an arbiter that simultaneously arbitrates between a plurality of messages having the same transmission destination and performs switch processing of the switch, 571 indicates a 4×4 crossbar switch, and 580 and 581 indicate optical fibers.

In the prior-art network shown in FIG. 1, message transmission is performed as follows:

A transmitted message arriving at network interface 510 of processor input/output port 500 is stored in transmission queue 520 as a packet. A packet arriving at the leading end of transmission queue 520 is electro-optically converted at optical transmitter 550 and outputted to optical fiber 580 for transmission as an optical signal. This optical signal is then photo-electrically converted at optical receiver 552 of optical switching device 560 and stored in reception queue 522.

After arbiter 570 switches 4×4 crossbar switch 571, the packet is again electro-optically converted at optical transmitter 553, and then received at the target processor input/output port by way of an optical fiber.

As described hereinabove, prior-art systems using electrical switches (switching methods effected by, for example, electrical signal crossbar switches such as shown in FIG. 1) require sequential performance of photo-electric conversion, routing processes by electrical circuits, and electro-optical conversion, and therefore, entail an extremely long period of time for signals to traverse switches and consequent extended latency.

As a countermeasure to this problem, the employment of an optical network of a switching circuit system can be considered that employs as switches optical switches that do not require photo-electric and electro-optical conversion.

When a line is connected with such an optical switch, optical signals pass from optical transmitter to optical receiver directly through optical switches without electrical signal processing, and as a result, latency required for traversing switches is greatly improved over that of an electrical switching method.

However, because this optical network is a circuit switching network, before transmission of optical signals begins, line connection processing such as prescribed arbitration (arbitration and switching processing between a plurality of messages having the same transmission destination) and electro-optical conversion must be carried out when transmitting optical signals on the optical transmitter side, and these processes result in overhead as before, giving rise to problems regarding latency.

Thus, although the prior-art optical technology contributes greatly toward improving throughput, the prior art still cannot achieve an optical network having low latency, and consequently, cannot be readily applied in fields requiring low latency such as in a network in a multiprocessor system.

SUMMARY OF THE INVENTION

The present invention was developed in view of the above-described problems of the prior art with the object of providing an optical switching network and associated control method capable of both reducing latency required for the passage of signals through signal switching devices as well reducing the overhead of line connection processing and electro-optical conversion arising before the beginning of transmission of optical signals.

In order to achieve the above-described objects, the optical switching network of the present invention includes a plurality of data transmitters that each include a network interface circuit that divides transmitted messages into control information and transmission data, a control information queue capable of storing and again reading out the control information, a transmission data queue capable of storing and again reading out transmission data, a queue control circuit that controls the control information queue and the transmission data queue, an optical transmitter that electro-optically converts and outputs the transmission data, an optical receiver that photoelectrically converts the inputted optical signals, and a reception buffer that stores the output of the optical receiver; and an optical switching device that includes an optical switch for carrying out routing of transmitted data from the optical transmitters, and an arbiter that carries out transmission and reception of control data with the data transmitter and switching control of the optical switch.

The above-described data transmitter includes: a network interface circuit that receives transmitted messages, disassembles transmitted messages into control information and transmission data, and individually transmits the control information and transmission data in control packets and data packets; a first transmission buffer that stores the control packets; a second transmission buffer that stores the data packets; a first retry buffer that temporarily shunts and stores the control packets; a second retry buffer that temporarily shunts and stores the data packets; a queue control circuit that controls the first and second transmission buffers and the first and second retry buffers; an optical transmitter that electro-optically converts the data packets and outputs to an optical transmission path; an optical receiver that photoelectrically converts optical signals inputted from the optical transmission path; and a reception buffer that stores the output of the optical receiver as reception data.

The above-described optical switching device includes an optical switch that performs routing processes on data packets transmitted from the optical transmitter; and an arbiter that manages line connection information and performs arbitration processing including processing of control packets from the data transmitters, transmission of control signals to the queue control circuit of the data transmitter, and switching control of the optical switch.

In addition, the control method of the optical switching network of the present invention includes: a step for carrying out in parallel arbitration processing in the arbiter of the optical switching device and electro-optical conversion of transmission data in the optical transmitter; a step for switching the optical switch and causing the transmission data to pass through when the arbitration process succeeds in making a line connection with the optical receiver; and when the arbitration process fails to make a line connection with the optical receiver, a step for resending transmission data that can be read again from the transmission data queue of the data transmitter after line connection.

In addition, the optical switching network of the present invention includes a plurality of data transmitters that each include a network interface circuit that divides transmitted messages into control information and transmission data, respective optical transmitters that electro-optically convert and output the transmission data and control information, a wavelength multiplexer that multiplexes output signals of the optical transmitters, a wavelength divider that divides inputted optical signals into two optical signals, an optical receiver that receives two wavelength-divided optical signals as reception data and control signals, respectively, a queue control circuit that receives the control signals and performs queue control, and a reception buffer that stores the reception data; and an optical switching device that includes a wavelength divider that divides the wavelength-multiplexed optical signals from the data transmitter into transmission data and control information, an optical switch that performs routing processing of the transmission data, an optical receiver that receives the control information, an arbiter that processes the control information, an optical transmitter that transmits control signals from the optical switch, and a wavelength multiplexer that multiplexes optical signals from the optical switch and the optical transmitters.

The above-described data transmitters each include:

a network interface circuit that receives transmitted messages, disassembles the transmitted messages into control information and transmission data, and individually divides the transmitted messages into control packets and data packets;

a first optical transmitter that electro-optically converts the data packets and outputs the result to an optical transmission path;

a second optical transmitter that electro-optically converts the control packets as optical signals assigned to a wavelength distinct from that of optical signals from the first optical transmitter and outputs the result to an optical transmission path;

a wavelength multiplexer that multiplexes optical signals from the first optical transmitter and optical signals from the second optical transmitter;

a wavelength divider that divides optical signals from an optical transmission path into optical signals of the first wavelength and optical signals of the second wavelength;

a first optical receiver that receives optical signals as data packets;

a second optical receiver that inputs optical signals of a second wavelength differing from that of optical signals inputted to the first optical receiver, photoelectrically converts these optical signals and receives the result as control signals;

a queue control circuit that receives control signals from the second optical receiver and performs queue control; and a reception buffer that stores data packets from the first optical receiver.

The above-described optical switching device includes a wavelength divider that divides wavelength-multiplexed optical signals from the data transmitters into data packets and control packets, an optical switch that performs routing processing for the data packets, an optical receiver that receives the control packets, an arbiter that performs arbitration processing for processing the control packets, an optical transmitter that transmits control signals for responding to the data transmitters that are assigned a wavelength differing from that of optical signals from the optical switch, and wavelength multiplexer that multiplexes optical signals from the optical switch and the optical transmitters.

The above-described data transmitters further include a first transmission buffer that stores the control packets and a second transmission buffer that stores the data packets, a first retry buffer that temporarily shunts and stores the control packets and a second retry buffer that temporarily shunts and stores the data packets, and a queue control circuit that controls the first and second transmission buffers and the first and second retry buffers.

The above-described arbitration process further includes a step for returning as an answer signal to a data transmitter a signal for causing the transmission data queue to be cleared when the arbitration process succeeds in line connection with an optical receiver; and for returning as an answer signal a signal for causing the control information and the transmission data to be held in the transmission data queue when the arbitration process fails in line connection.

In addition, the first and second transmission buffers, the first and second retry buffers, and the reception buffers in the data transmitters include first-in first-out buffers.

By using an optical switching network according to the above-described construction of the present invention, electro-optical and photoelectric conversion in switches can be omitted, latency required for passage of signals through switches can be reduced, and in addition, because control information such as the transmission destination address of a message can be divided from the data and expanded in parallel in the processor data transmission device, arbitration processes for control packets can be performed in parallel with electro-optical conversion of data packets in optical transmitters, thereby enabling a reduction in overhead of arbitration processes.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

Figure 1:
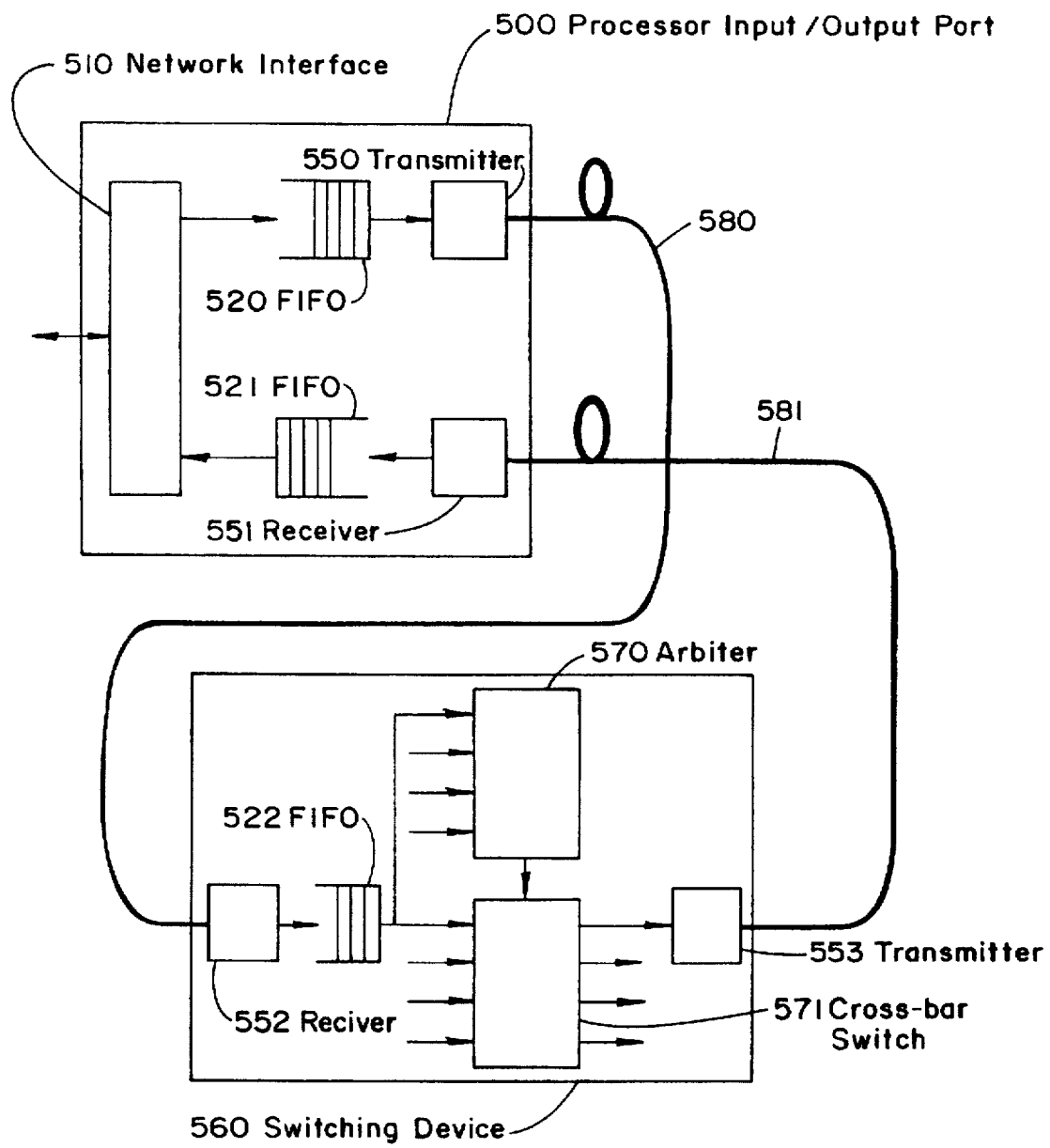
FIG. 1 shows the construction of one example of an optical network of the prior art.
Figure 2:
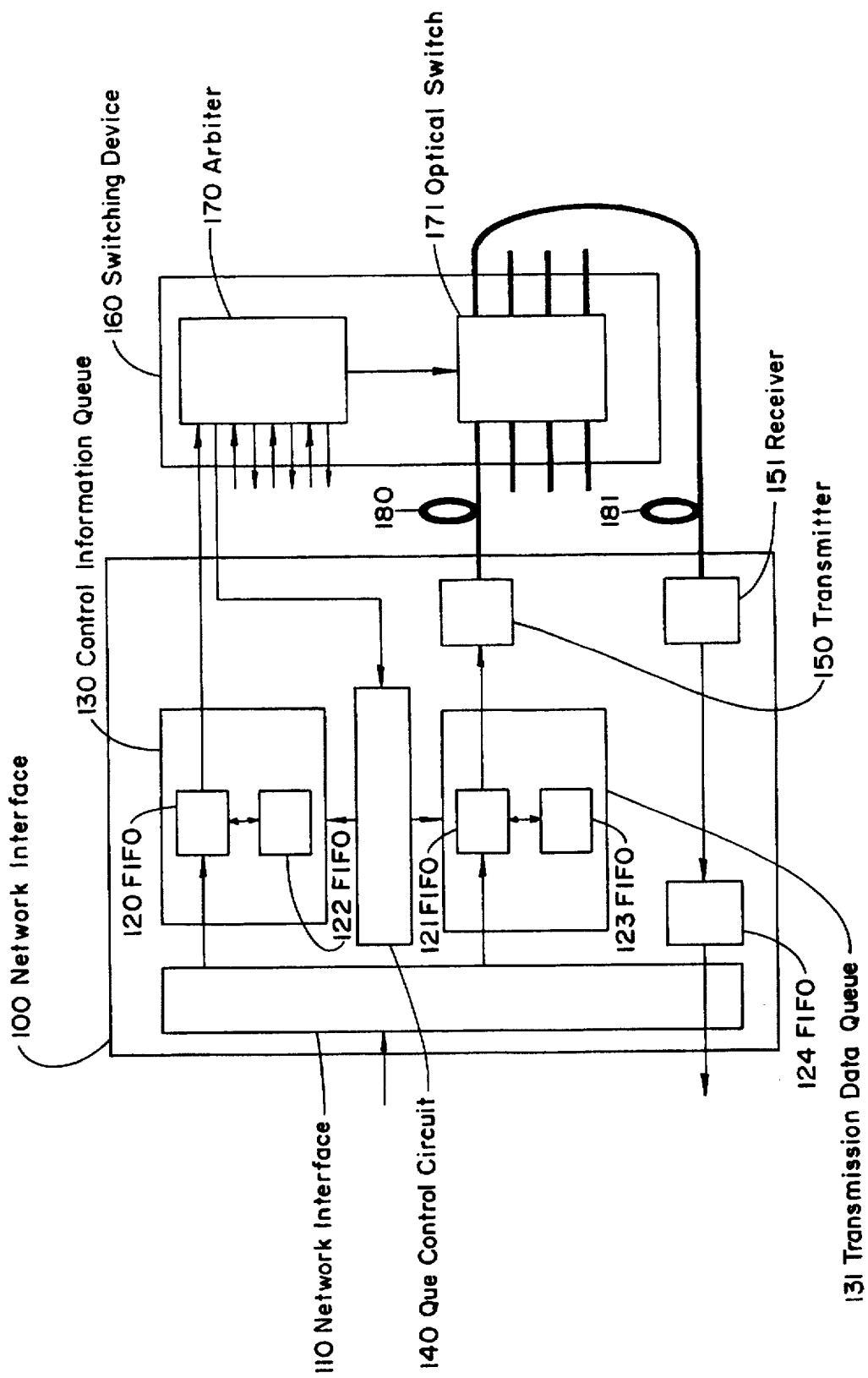
FIG. 2 shows the construction of an optical switching network according to the first embodiment of the present invention.

Embodiments of the present invention will next be explained with reference to the accompanying drawings. FIG. 2 shows the construction of the first embodiment of the present invention, and shows the construction for a case employing a 4×4 optical crossbar switch as the switch.

In FIG. 2, reference numeral 100 indicates a processor input/output port, 110 indicates a network interface, 120 indicates a first-in first-out (FIFO) control information buffer, 121 indicates a first-in first out (FIFO) transmission data buffer, 122 and 123 indicate first-in first-out (FIFO) retry buffers, 124 indicates a first-in first-out (FIFO) reception buffer, 130 indicates a control information queue, 131 indicates a transmission data queue, 140 indicates a queue control circuit, 150 indicates an optical transmitter, 151 indicates an optical receiver, 160 indicates an optical switching device, 170 indicates an arbiter, 171 indicates a 4×4 optical crossbar switch, and 180 and 181 indicate optical fibers.

Network interface 110 disassembles a transmitted message arriving at processor input/output port 100 into transmission data and control information such as the transmission destination address and data length, and converts each of these to individual packets to produce control packets and data packets.

The disassembled control packets and data packets are stored in control information buffer 120 and transmission data buffer 121, respectively.

A control packet arriving at the start of control information buffer 120 also arrives at arbiter 170 within the optical switching device 160 as a transmission request from processor input/output port 100.

The control packet is not electro-optically converted but is transmitted unchanged as an electrical signal from processor input/output port 100 to arbiter 170 within optical switching device 160.

On the other hand, a data packet arriving at the start of transmission data buffer 121 is inputted to optical transmitter 150.

In the optical transmitter 150, the data packet undergoes a 8B10B encoding process by which each 8 bits are encoded to 10 bits and a parallel-serial conversion, and the serial electrical signals then pass through an unshown laser diode (LD; semiconductor laser) and are electro-optically converted and outputted as optical signals.

The packet, now converted to optical signals, next arrives at 4×4 optical crossbar switch 171 within optical switching device 160 by way of optical fiber 180.

At the current state of electrical circuit technology, electro-optical conversion within optical transmitter 150 requires a time interval on the order of 30 ns.

As a result, a control packet transmitted as an electrical signal will arrive at optical switching device 160 approximately 30 ns earlier than a data packet that is transmitted following conversion to an optical signal.

This time interval (approximately 30 ns) is sufficient for arbiter 170 of optical switching device 160 to perform arbitration processes that include control packet processing, which includes management of line connection information, acceptance of transmission requests from the input/output port, and arbitration between a plurality of messages having the same transmission destination; as well as transmission of control signals based on the arbitration results for designating the next operation to the queue control circuit of input/output port, and switch control of the optical switch which performs the routing of data packets.

If a line is secured, arbiter 170 switches 4×4 optical crossbar switch 171 in accordance with the timing of the passage of late-arriving data packets, and data packets therefore pass through optical switching device 160.

In addition, arbiter 170 echoes success in securing a line as reply information (answer information) to queue control circuit 140. In this case, arbitration processing overhead is zero because data packets are transmitted without waiting for a line to be secured.

On the other hand, in the event of failure to secure a line, arbiter 170 echoes a hold request as the reply information to queue control circuit 140 to halt transmission until a line can be secured.

In such a case, packets taken from transmission data buffer 121 will be lost because transmitter 150 lacks the function to hold data packets.

To prevent this potential loss of packets, retry buffers 122 and 123 are provided in processor input/output port 100 for control-use packets and data packets, respectively, to which transmission packets are temporarily shunted and held.

In addition, because data packets that have been electro-optically converted in parallel to arbitration processing will become invalid data at the time of failure to secure a line, arbiter 170 of optical switching device 160 closes the input port of 4×4 optical crossbar switch 171 to block invalid data packets. This process prevents the arrival of invalid data to optical receiver 151.

When a line is subsequently secured, arbiter 170 of optical switching device 160 notifies queue control circuit 140 of processor input/output port 100 by way of a prescribed control signal line, and queue control circuit 140 begins resending of packets shunted to retry buffers 122 and 123 of control information queue 130 and transmission data queue 131.

At the time of resending, data packets transmitted by way of retry buffer 123 and optical transmitter 150 and as optical signals over optical fiber 180 pass through 4×4 optical crossbar switch 171 of optical switching device 160.

Upon completion of resending, queue control circuit 140 again returns to normal operation in which transmission is carried out from control information buffer 120 and transmission data buffer 121. In this case, (in normal operation following resending), overhead is caused by resend requests and retry processing. In addition, retry buffers 122 and 123 are cleared upon success in line connection.

The second embodiment of the present invention will next be explained with reference to the accompanying figures.

Figure 3:
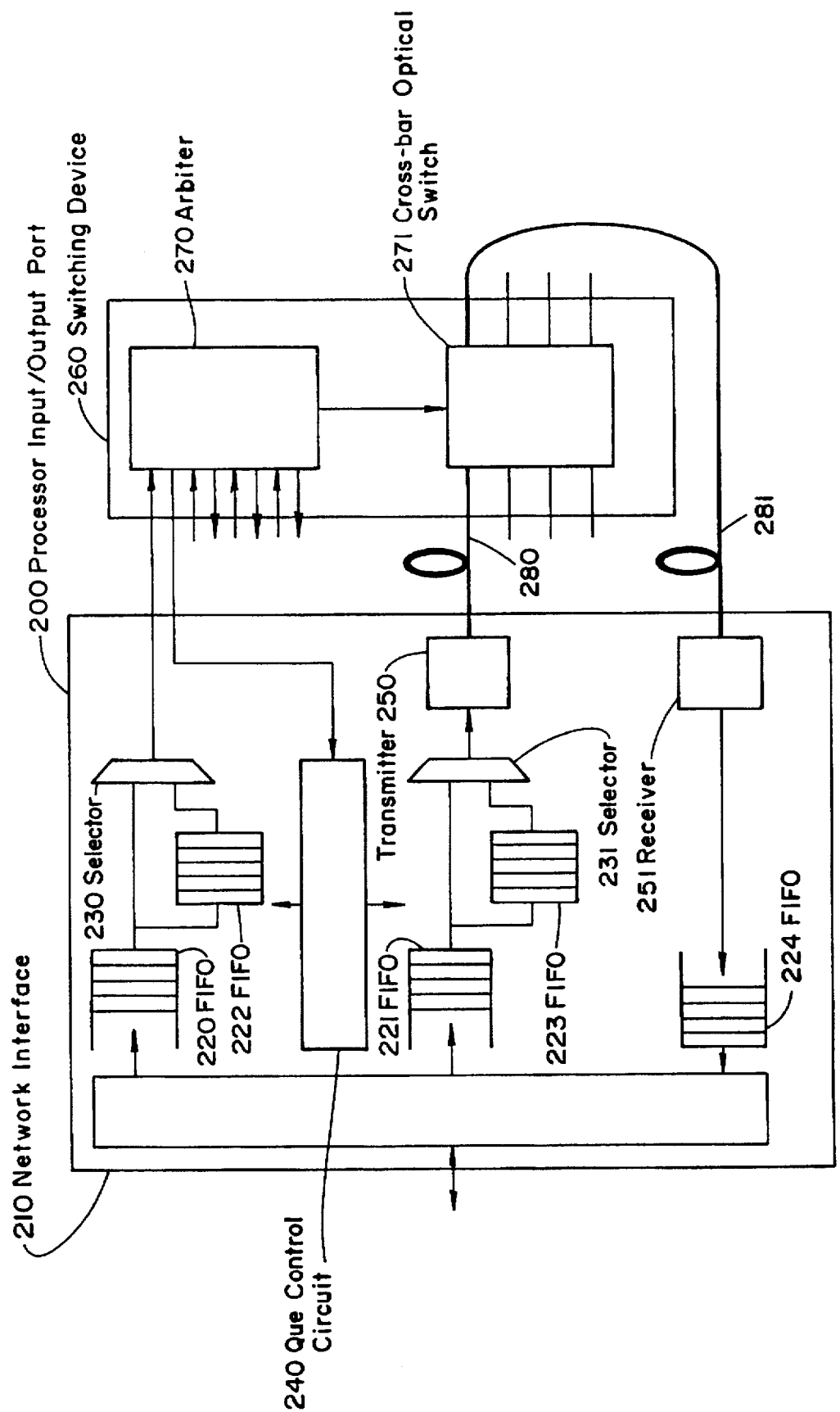
FIG. 3 shows the construction of an optical switching network according to the second embodiment of the present invention.

FIG. 3 shows the construction of the second embodiment of the present invention, and shows the construction for a case in which a 4×4 optical crossbar switch is used as the switch.

In FIG. 3, reference numeral 200 indicates a processor input/output port, 210 indicates a network interface, 220 indicates a first-in first-out (FIFO) transmission queue for storage of control information, 221 indicates a first-in first out (FIFO) transmission queue for storage of data signals, 222 and 223 indicate retry buffers (first-in first-out (FIFO) buffers for retrying), 224 indicates a first-in first-out (FIFO) reception queue, 230 and 231 indicate selectors, 240 indicates a queue control circuit, 250 indicates an optical transmitter, 251 indicates an optical receiver, 260 indicates an optical switching device, 270 indicates an arbiter, 271 indicates a 4×4 optical crossbar switch, and 280 and 281 indicate optical fibers.

Network interface 210 disassembles a transmitted message arriving at processor input/output port 200 into transmission data and control information such as the transmission destination address and data length, and converts each of these to individual packets to produce control packets and data packets.

The disassembled control packets and data packets are stored in control transmission queue 220 and data transmission queue 221, respectively.

A control packet arriving at the start of control transmission queue 220 also passes through selector 230 and arrives at arbiter 270 within optical switching device 260 as a transmission request from processor input/output port 200.

The control packet is not electro-optically converted but is transmitted unchanged as an electrical signal from processor input/output port 200 to arbiter 270 within optical switching device 260.

On the other hand, a data packet arriving at the start of transmission queue 221 passes through selector 231 and is inputted to optical transmitter 250.

In the optical transmitter 250, the data packet undergoes a 8B10B encoding process by which each 8 bits are encoded to 10 bits and a parallel-serial conversion, and the serial electrical signals then pass through an unshown laser diode (LD; semiconductor laser) and are electro-optically converted and outputted as optical signals.

The packet, now converted to optical signals, next arrives at 4×4 optical crossbar switch 271 within optical switching device 260 by way of optical fiber 280.

At the current state of electrical circuit technology, electro-optical conversion within optical transmitter 250 requires a time interval on the order of 30 ns.

As a result, a control packet transmitted as an electrical signal will arrive at optical switching device 260 approximately 30 ns earlier than a data packet that is transmitted following conversion to an optical signal.

This time interval (approximately 30 ns) is sufficient for arbiter 270 of optical switching device 260 to perform arbitration processes that include control packet processing, which includes management of line connection information, acceptance of transmission requests from the input/output port, and arbitration between a plurality of messages having the same transmission destination; as well as transmission of control signals based on the arbitration results for designating the next operation to the queue control circuit of input/output port; and switch control of the optical switch which performs the routing of data packets.

Upon success in securing a line, arbiter 270 switches 4×4 optical crossbar switch 271 at a timing that matches the passage of data packets arriving late, and as a result, data packets proceed through optical switching device 260.

Moreover, arbiter 270 echoes success in securing a line as reply information (answer information) to queue control circuit 240. In this case, arbitration processing overhead is zero because data packets are transmitted without waiting for a line to be secured.

On the other hand, in the event of failure to secure a line, arbiter 270 echoes a hold request as the reply information to queue control circuit 240 to halt transmission until a line can be secured.

In such a case, packets taken from transmission queue 221 will be lost because transmitter 250 lacks the function to hold data packets.

To prevent this potential loss of packets, retry buffers 222 and 223 are provided in processor input/output port 200 for control-use packets and data packets, respectively, to which transmission packets are temporarily shunted and held.

In addition, because data packets that have been electro-optically converted in parallel to arbitration processing will become invalid data at the time of failure to secure a line, arbiter 270 of optical switching device 260 closes the input port of 4×4 optical crossbar switch 271 to block invalid data packets. This process prevents the arrival of invalid data to optical receiver 251.

When a line is subsequently secured, arbiter 270 of optical switching device 260 notifies queue control circuit 240 of processor input/output port 200 by way of a prescribed control signal line, and queue control circuit 240 switches selectors 230 and 231 and begins resending of packets shunted to retry buffers 222 and 223.

At the time of resending, data packets transmitted by way of retry buffer 223 and optical transmitter 250 and as optical signals over optical fiber 280 pass through 4×4 optical crossbar switch 271 of optical switching device 260.

Upon completion of resending, queue control circuit 240 again switches selectors 230 and 231 and returns to normal operation in which transmission of control packets and data packets is carried out from transmission queues 220 and 221. In this case, (in normal operation following resending), overhead is caused by resend requests and retry processing. In addition, retry buffers 222 and 223 are cleared upon success in line connection.

Figure 4:
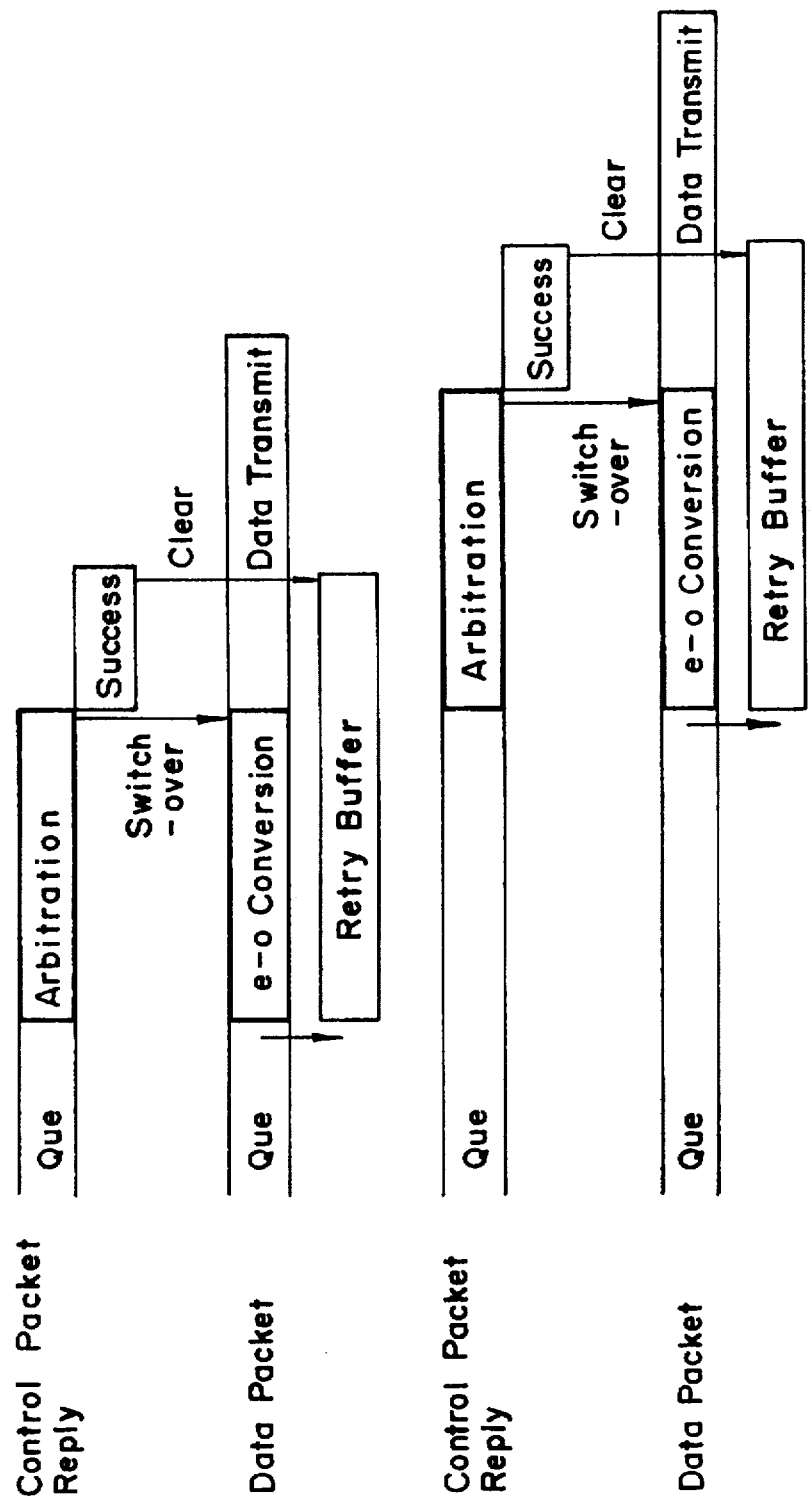
FIG. 4 is a timing chart illustrating the operation of the optical switching device and processor input/output port when line connection is achieved in the second embodiment of the present invention.

FIG. 4 is a timing chart illustrating operation for a case in which line connection is achieved in optical switching device 260.

When a line connection is achieved, network latency can be greatly reduced as compared with the prior art because arbitration processes, which use information from control packets arriving in optical switching device 260 earlier than data packets transmitted as optical signals, are carried out absolutely parallel with electro-optical conversion in optical transmitter 250 of processor input/output port 200 (i.e., the processing times overlap).

Moreover, as a result of arbitration processing, arbiter 270 causes switching of the switch of 4×4 optical crossbar switch 271 and echoes back to processor input/output port 200 the success in line connection as a reply signal (electrical signal) in the event of success in securing a line, and upon receiving this signal, retry buffers 222 and 223 are cleared.

Figure 5:
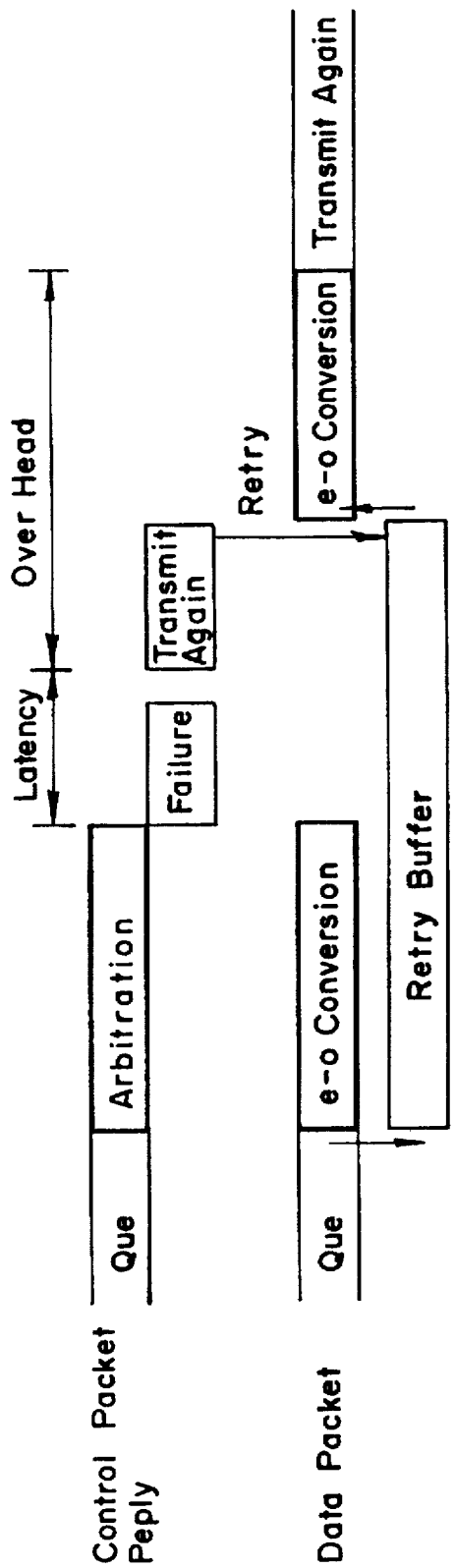
FIG. 5 is a timing chart illustrating the operation of the optical switching device and processor input/output port when line connection fails in the second embodiment of the present invention.

FIG. 5 is a timing chart illustrating the operation in the event of failure of line connection in optical switching device 260. Essentially, when arbiter 270 fails to secure a line in the arbitration process, it echoes a hold request as reply information to queue control circuit 240 of processor input/output port 200, and when a line connection is subsequently secured and a resending request is notified to queue control circuit 240, data packets stored in retry buffer 223 are electro-optically converted and transmitted to optical switching device 260 by optical transmitter 250 and then outputted from 4×4 optical crossbar switch 271 to the connection destination. Although overhead of the arbitration process and electro-optical conversion cannot be reduced in this case, network latency can be reduced on average because success in line connection is generally more common.

In the above-described embodiments of the present invention, data packets are propagated as optical signals over optical fibers, but optical signals may also be used for control packets. Because both the amount of information and bit width of control packets are small, control packets can be left unchanged as parallel and transmitted at low speed without effecting parallel-serial conversion (data packets being parallel-serial converted and transmitted at high-speed as optical signals), and in this case, arbitration processing and electro-optical conversion of data packets can be carried out in parallel as for a case in which control packets are sent as electrical signals.

In addition, switches of constructions other than a crossbar construction may be used as an optical switch.

Figure 6:
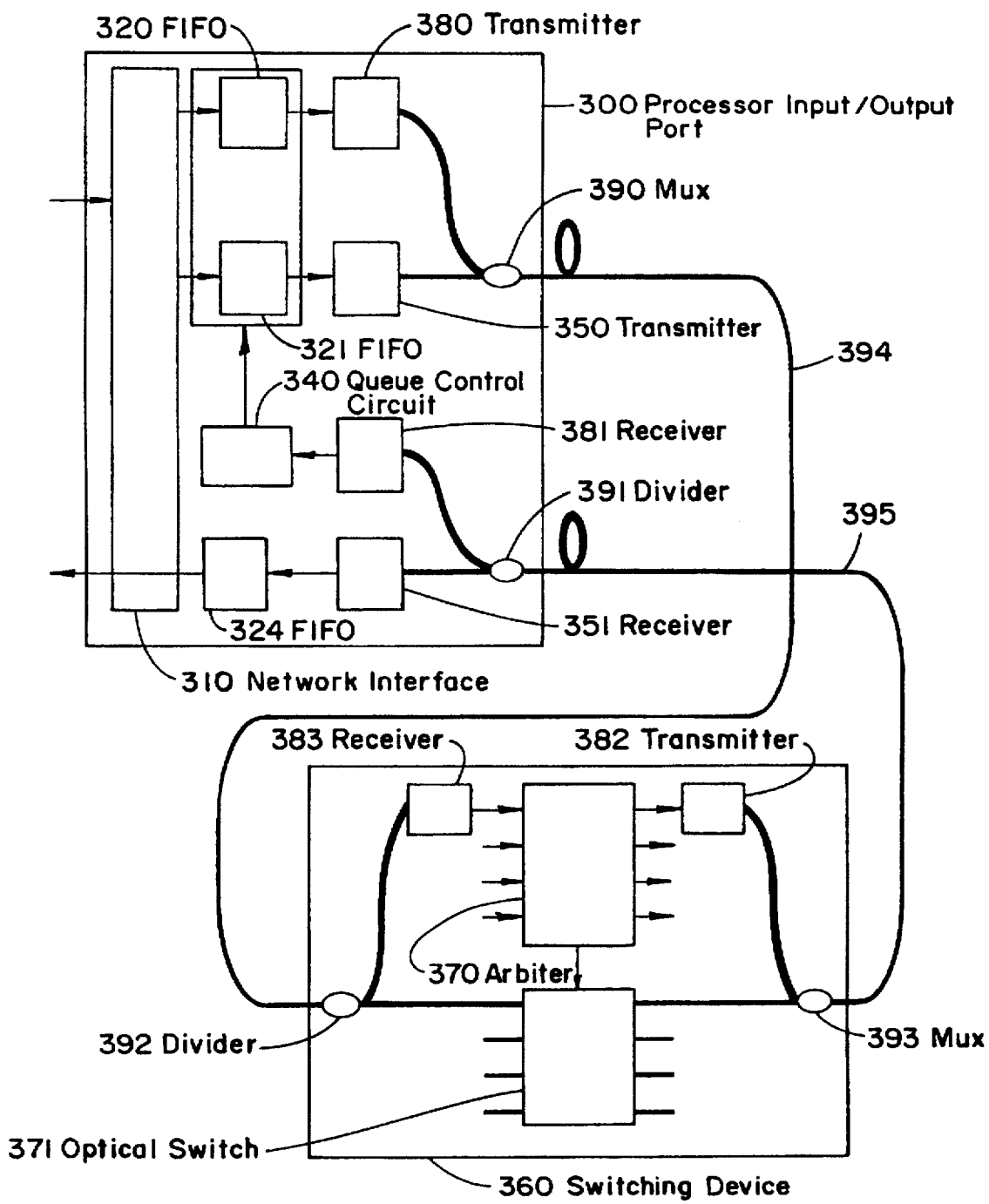
FIG. 6 shows construction of an optical switching network according to the third embodiment of the present invention.

The third embodiment of the present invention will next be explained. FIG. 6 shows the construction of the third embodiment of the present invention and shows an example of construction employing wavelength division multiplexing.

In the present embodiment, optical signals of differing wavelengths are assigned to data packets and control packets, thereby enabling propagation on sending and receiving transmission lines between processor input/output port 300 and optical switching device 360 over single optical fibers 394 and 395.

Referring to FIG. 6, processor input/output port 300 is made up of network interface 310, first-in first-out (FIFO) transmission queue 320 for storage of control information, first-in first-out (FIFO) transmission queue 321 for storage of data signals, first-in first-out (FIFO) reception queue 324, queue control circuit 340, optical transmitter 350, and optical receiver 351. Constituent elements equivalent to those of the first embodiment described hereinabove with reference to FIG. 2 perform equivalent functions and explanation of these elements is therefore here omitted.

In the present embodiment, control packets from first-in first-out (FIFO) transmission queue 320 for storage of control information are electro-optically converted to optical signals of a prescribed wavelength at optical transmitter 380, data packets from first-in first-out (FIFO) transmission queue 321 for storage of data signals are electro-optically converted to optical signals of a wavelength differing from that of the control packets at optical transmitter 350, and these optical signals are wavelength-multiplexed at WDM (wavelength division multiplex) coupler (wavelength multiplexer) 390 and transmitted to optical fiber 394. Optical signals (wavelength-multiplexed signals) transmitted from optical fiber 395 from optical switching device 360 are wavelength-divided at WDM coupler 391 into, for example, control signals and data packets, and respectively supplied to optical receivers 381 and 351; control signals that have been photo-electrically converted at optical receiver 381 are supplied to queue control circuit 340; and, after being photo-electrically converted at optical receiver 351, data packets are outputted to network interface 310 by way of reception queue 324. Optical switching device 360 is made up of arbiter 370, 4×4 optical crossbar switch 371, WDM coupler (wavelength divider) 392, WDM coupler (wavelength multiplexer) 393, optical receiver 383, and optical transmitter 382. WDM coupler (wavelength multiplexer) 393 wavelength-multiplexes the optical signals from 4×4 optical crossbar switch 371 and the output of optical transmitter 382, which converts reply signals (electrical signals) to be outputted to processor input/output port 300 from arbiter 370 into optical signals that are assigned a wavelength differing from that of optical signals from 4×4 optical crossbar switch 371, and sends the result to processor input/output port 300.

Figure 7:
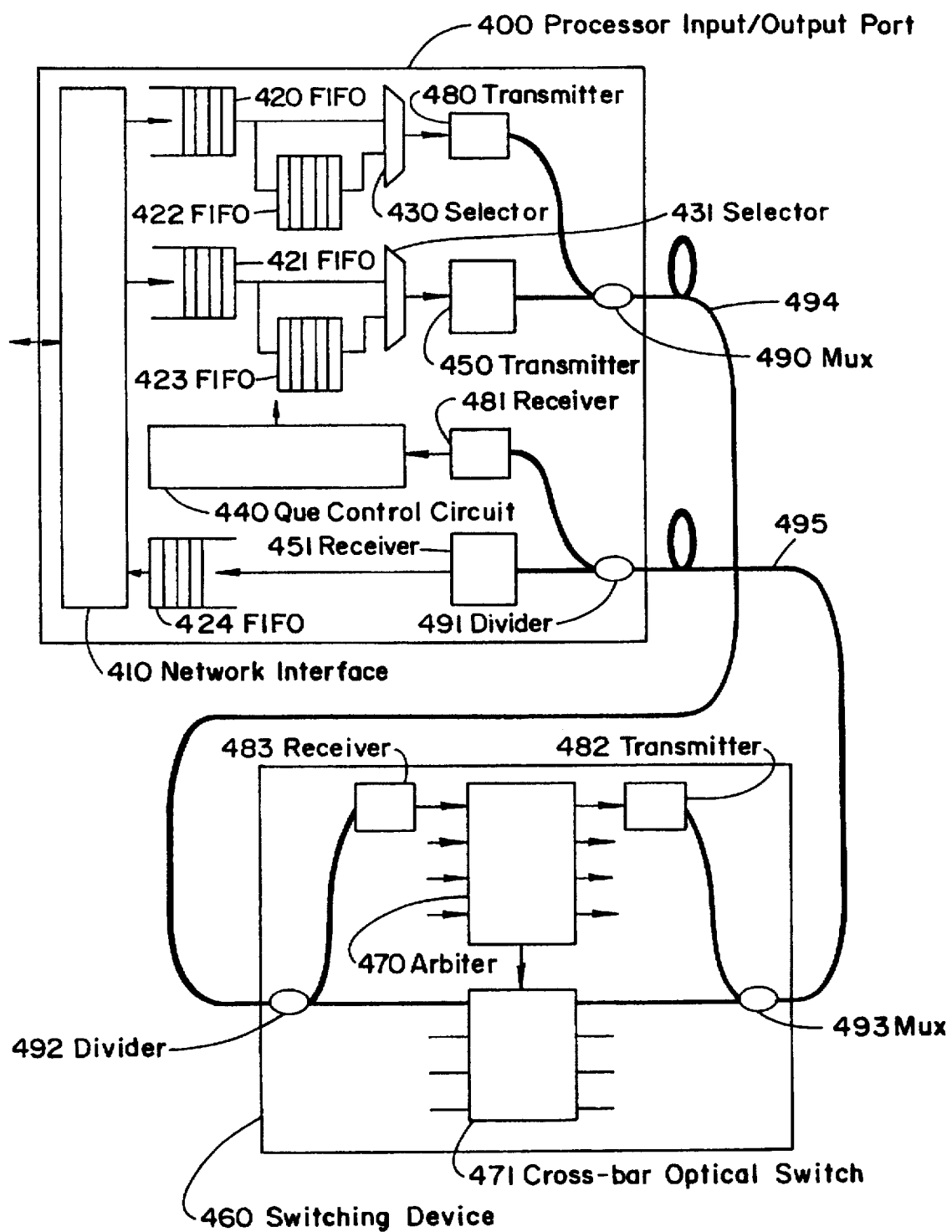
FIG. 7 shows the construction of an optical switching network according to the fourth embodiment of the present invention.

An explanation of the fourth embodiment of the present invention will next be given. FIG. 7 shows the construction of the fourth embodiment of the present invention, and shows an example of a construction employing wavelength division multiplexing.

In the present embodiment, optical signals of differing wavelengths are assigned to data packets and control packets, thereby enabling propagation on sending and receiving transmission lines between processor input/output port 400 and optical switching device 460 over single optical fibers 494 and 495.

Referring to FIG. 7, processor input/output port 400 is made up of network interface 410, first-in first-out (FIFO) transmission queue 420 for storage of control information, first-in first-out (FIFO) transmission queue 421 for storage of data signals, first-in first-out (FIFO) retry buffers 422 and 423, first-in first-out (FIFO) reception queue 424, selectors 430 and 431, queue control circuit 440, optical transmitter 450, and optical receiver 451. Constituent elements corresponding to those of the second embodiment described hereinabove with reference to FIG. 3 perform equivalent functions and explanation of these elements is therefore here omitted.

In the present embodiment, control packets from selector 430 are electro-optically converted to optical signals of a prescribed wavelength at optical transmitter 480, data packets from selector 431 are electro-optically converted to optical signals of a wavelength differing from that of the control packets at optical transmitter 450, and these optical signals are wavelength-multiplexed at WDM coupler (wavelength multiplexer) 490 and transmitted to optical fiber 494. Optical signals (wavelength-multiplexed signals) transmitted from optical fiber 495 from optical switching device 460 are wavelength-divided at WDM coupler 491 into, for example, control signals and data packets, and respectively supplied to optical receivers 481 and 451, control signals that have been photo-electrically converted at optical receiver 481 are supplied to queue control circuit 440; and, after being photo-electrically converted at optical receiver 451, data packets are outputted to network interface 410 by way of reception queue 424. Optical switching device 460 is made up of arbiter 470, 4×4 optical crossbar switch 471, WDM coupler (wavelength divider) 492, WDM coupler (wavelength multiplexer) 493, optical receiver 483, and optical transmitter 482.

WDM coupler (wavelength multiplexer) 493 wavelength-multiplexes the optical signals from 4×4 optical crossbar switch 471 and the output of optical transmitter 482, which converts reply signals (electrical signals) to be outputted to processor input/output port 400 from arbiter 470 into optical signals that are assigned a wavelength differing from that of optical signals from 4×4 optical crossbar switch 471, and sends the result to processor input/output port 400.

In the above-described embodiments of the present invention, although transmission between a processor input/output port and an optical switching device was explained as an example of an optical switching control method suitable for a multiprocessor, the present invention is not limited to the construction of the above-described embodiments, and can of course be applied to any optical switching network of optical switching devices and processor input/output port based on the principles of the present invention.

According to the present invention as explained hereinabove, when lines are connected, optical signals pass from an optical transmitter to an optical receiver through an optical switches, thereby greatly improving latency as compared with an electrical switching method.

Moreover, the present invention enables a remarkable reduction in latency required for message transmission due to a construction in which arbitration processing of control packets in an arbiter is performed parallel with electro-optical conversion of data packets in an optical transmitter.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. An optical switching network comprising:

a plurality of data transmitters that each include a network interface circuit that divides transmitted messages into control information and transmission data, a control information queue capable of storing and again reading out said control information, a transmission data queue capable of storing and again reading out transmission data, a queue control circuit that controls said control information queue and said transmission data queue, an optical transmitter that electro-optically converts and outputs said transmission data, an optical receiver that photo-electrically converts inputted optical signals, and a reception buffer that stores output of said optical receiver; and an optical switching device that includes an optical switch for carrying out routing of transmitted data from said optical transmitters, and an arbiter that carries out transmission and reception of control data with said data transmitter and switching control of said optical switch.

2. An optical switching network according to claim 1 wherein said data transmitters each comprise:

a network interface circuit that receives transmitted messages, disassembles said transmitted messages into control information and transmission data, and individually transmits said control information and transmission data in control packets and data packets; a first transmission buffer that stores said control packets; a second transmission buffer that stores the data packets;

a first retry buffer that temporarily shunts and stores said control packets; a second retry buffer that temporarily shunts and stores said data packets;

a queue control circuit that controls said first and second transmission buffers and said first and second retry buffers;

an optical transmitter that electro-optically converts said data packets and outputs to an optical transmission path;

an optical receiver that photoelectrically converts optical signals inputted from an optical transmission path; and a reception buffer that stores output of said optical receiver as reception data.

3. An optical switching network according to claim 2 wherein said first and second transmission buffers, said first and second retry buffers, and said reception buffer in each of said data transmitters comprise first-in first-out buffers.

4. An optical switching network comprising an optical switching device comprising:

an optical switch that performs routing processes on data packets transmitted from an optical transmitter; and an arbiter that manages line connection information and performs arbitration processing including processing of control packets from said optical transmitter, transmission of control signals to a queue control circuit of said optical transmitter, and switching control of said optical switch.

5. A control method of an optical switching network comprising:

a plurality of data transmitters that each include a network interface circuit that divides transmitted messages into control information and transmission data, a control information queue capable of storing and again reading out said control information, a transmission data queue capable of storing and again reading out transmission data, a queue control circuit that controls said control information queue and said transmission data queue, an optical transmitter that electro-optically converts and outputs said transmission data, an optical receiver that photoelectrically converts inputted optical signals, and a reception buffer that stores output of said optical receiver; and an optical switching device that includes an optical switch for carrying out routing of transmitted data from said optical transmitters, and an arbiter that carries out transmission and reception of control data with said data transmitter and switching control of said optical switch;

said control method comprising:

a step for carrying out in parallel arbitration processing in said arbiter of said optical switching device and electro-optical conversion of transmission data in said optical transmitter;

a step for switching said optical switch and causing said transmission data to pass through when said arbitration process succeeds in making a line connection with said optical receiver; and when the arbitration process fails to make a line connection with said optical receiver, a step for resending transmission data that can be read again from said transmission data queue of said data transmitter after line connection.

6. A control method of an optical switching network according to claim 5 wherein said arbitration process comprises:

a step for returning as an answer signal to said data transmitter a signal for causing said transmission data queue to be cleared when said arbitration process succeeds in line connection with an optical receiver; and for returning as an answer signal a signal for causing said control information and said transmission data to be held in said transmission data queue when said arbitration process fails in line connection.

7. An optical switching network according to claim 5 wherein said reception buffer in each of said data transmitters comprises a first-in first-out buffer.

8. An optical switching network comprising:

a network interface circuit that divides transmitted messages into control information and transmission data;

first and second optical transmitters that electro-optically convert said control information and said transmission data and output an optical control information and an optical transmission data, respectively;

a first wavelength multiplexer that multiplexes said optical control information and said optical transmission data and outputs a first multiplexed optical signal;

an optical switching device that includes:

a first wavelength divider which divides said first multiplexed optical signal into said optical control information and said optical transmission data;

an optical switch that performs routing processing of said optical transmission data and outputs routed optical data;

a first optical receiver that receives said optical control information and outputs a received control information;

an arbiter that process said received control information and outputs a processed control information;

a third optical transmitter that receives said processed control information and transmits a transmitted control information; and a second wavelength multiplexer that multiplexes said transmitted control information and said routed optical data, and outputs a second multiplexed optical signal;

a second optical receiver that receives said transmitted control information of said second multiplexed optical signal, and outputs control signals;

a third optical receiver that receives said routed optical data of said second multiplexed optical signal, and outputs reception data;

a queue control circuit that receives said control signals and performs queue control; and a reception buffer that stores said reception data.

9. An optical switching network according to claim 8 wherein said optical transmission data includes data packets and said optical control information includes control packets;

said optical switch performing routing processing for said data packets to provide routed optical data packets;

said optical receiver receiving said control packets;

said arbiter performing arbitration processing for processing said control packets; and said optical transmitter transmitting transmitted control information having a wavelength differing from that of said routed optical data; and a wavelength multiplexer that multiplexes optical signals from said optical switch and optical signals from said optical transmitters.

10. An optical switching network according to claim 8, wherein:

said network interface circuit disassembles said transmitted messages into said control information and said transmission data, and individually divides said transmitted messages into control packets and data packets;

said first optical transmitter electro-optically converts said control packets and provides said optical control information to a first optical transmission path;

said second optical transmitter electro-optically converts said data packets and provides said optical transmission data to a second optical transmission path, said optical transmission data being assigned to a first wavelength differing from a second wavelength of said optical control information;

said first wavelength divider divides said first multiplexed optical signal on a third optical transmission path into said optical control information having said second wavelength and said optical transmission data having said first wavelength; and said second optical receiver photoelectrically converts said transmitted control information of said second multiplexed optical signal, and outputs said control signals.

11. A data transmitter according to claim 10 further comprising:

a first transmission buffer that stores said control packets, a second transmission buffer that stores said data packets, a first retry buffer that temporarily shunts and stores said control packets, and a second retry buffer that temporarily shunts and stores said data packets; and said queue control circuit controlling said first and second transmission buffers and said first and second retry buffers.

12. An optical switching network according to claim 11 wherein said first and second transmission buffers, said first and second retry buffers, and said reception buffer in each of said data transmitters comprises first-in first-out buffers.

13. An optical switching network according to claim 8 wherein said reception buffer comprises a first-in first-out buffer.

* * * * *